Patented July 5, 1938

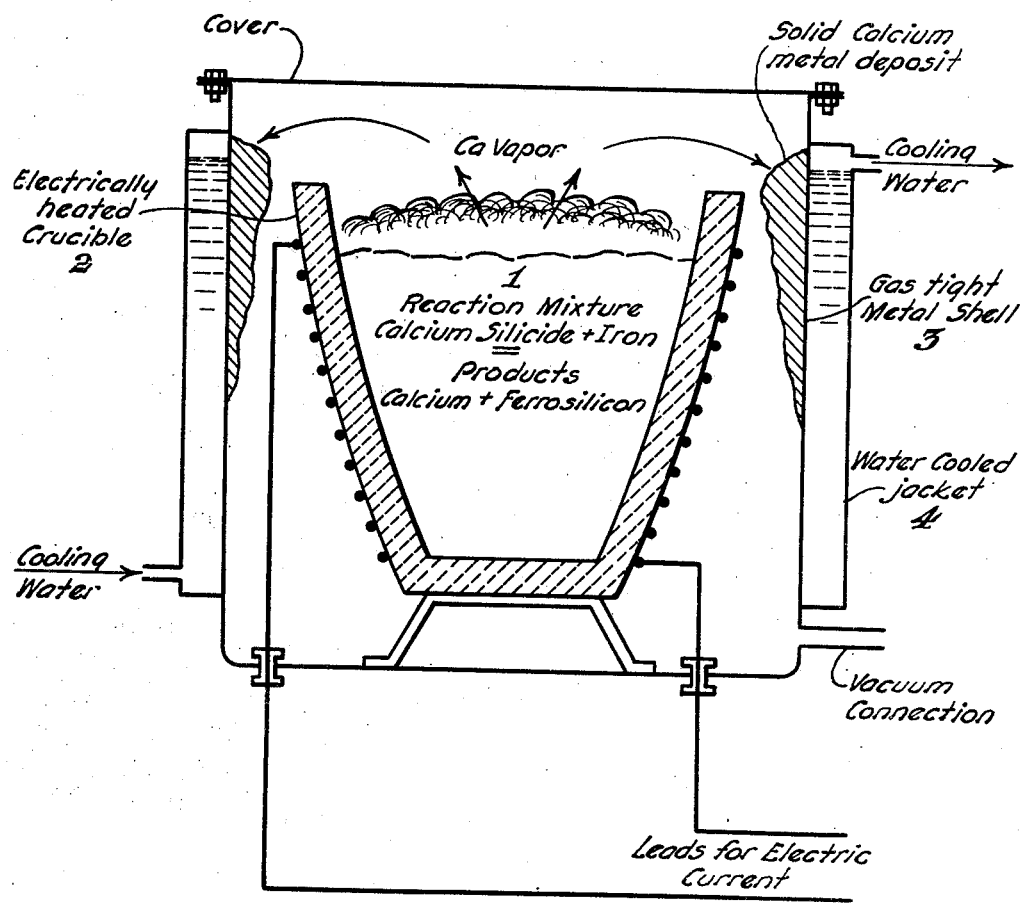

2,122,420

UNITED STATES PATENT OFFICE 2,122,420

METHOD OF MAKING CALCIUM

Joseph D. Hanawalt and Charles E. Nelson, Midland, Mich., assignors to The Dow Chemical Company, Midland, Mich., a corporation of Michigan Application October 2, 1936, Serial No. 103,743

6 Claims. (Cl. 75—67)

The invention relates to an improved method of making calcium metal.

We have discovered that by heating calcium silicide in the presence of iron to a sufficient temperature the iron combines with the silicon, liberating calcium vapor and forming ferro-silicon as a by-product. The reaction occurs apparently above about 1375° C. and proceeds smoothly and rapidly at temperatures between about 1400° and 1800° C.

The drawing illustrates diagrammatically the apparatus in which the method is practiced.

In carrying out the reaction the materials are first finely ground, if necessary, and then intimately mixed, preferably in approximately the proportions of from one to two moles of iron for each mole of silicon in the calcium silicide. The mixture is placed in a suitable vessel and heated to reaction temperature at sub-atmospheric pressure, or in an atmosphere of an inert gas, such as helium. The metal is liberated from the reaction mass as a vapor and may be condensed upon a suitable cooled surface, e. g. iron or steel. For example, referring to the drawing the mixture 1 of calcium silicide and iron may be placed in an electrically heated crucible 2 of a material preferably non-reactive to calcium vapor, such as carborundum, which is surrounded by a gas tight metal shell 3, the shell being cooled by the water jacket 4 so as to act as a condensing surface for the vaporized calcium. A graphite reaction vessel may be used in place of a carborundum vessel provided the calcium vapor evolved is immediately condensed on a condensing surface placed in close proximity to the reaction mass. The product is obtained in substantially pure form.

The following example is illustrative of a mode of carrying out the invention:—10 pounds of calcium silicide (containing 28.5 per cent of calcium, the balance being largely silicon) and 20 pounds of iron, both powdered, were mixed together and the mixture was placed in an open graphite vessel surrounded by a water-cooled vacuum-tight steel jacket in close proximity to the vessel. The interior of the jacket was maintained during the reaction at a pressure of less than 1 mm. of mercury by means of a vacuum pump. The temperature of the mixture was raised to between 1400° and 1600° C. by passing an electric current through the graphite vessel. During the heating operation calcium vapor was evolved from the mixture and condensed on the inner surface of the jacket in bright crystals which were substantially pure calcium. The yield was 2.4 pounds of calcium metal, or about 84 per cent of the calcium in the calcium silicide. The residue in the reaction vessel was largely ferro-silicon.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making metallic calcium, the step which consists in heating calcium silicide in the presence of iron to a temperature capable of liberating calcium.

2. In a method of making metallic calcium, the steps which consist in heating calcium silicide in the presence of iron to a temperature capable of liberating calcium vapor, and condensing the vapor.

3. In a method of making metallic calcium, the step which consists in heating a mixture of calcium silicide and iron to a temperature above 1375° C.

4. In a method of making metallic calcium, the step which consists in heating a mixture of calcium silicide and iron to a temperature between 1400° and 1600° C.

5. In a method of making metallic calcium, the steps which consist in heating a mixture of powdered calcium silicide and iron under sub-atmospheric pressure to a temperature above 1400° C. whereby calcium vapor is evolved, and condensing the vapor.

6. In a method of making metallic calcium, the steps which consist in heating a mixture of powdered calcium silicide and iron under sub-atmospheric pressure to a temperature between 1400° and 1600° C. whereby calcium vapor is evolved, and condensing the vapor.

JOSEPH D. HANAWALT.
CHARLES E. NELSON.